United States Patent
Hermanson et al.

(10) Patent No.: US 6,810,615 B2
(45) Date of Patent: Nov. 2, 2004

(54) METHOD FOR GUN BARREL MANUFACTURE USING TAILORED AUTOFRETTAGE MANDRELS

(75) Inventors: Michael J. Hermanson, Andover, MN (US); Brian Bauman, White Bear Lake, MN (US); Donald A. Nalley, New Albany, IN (US)

(73) Assignee: United Defense, L.P., Arlington, VA (US)

( * ) Notice: Subject to any disclaimer, the term of this patent is extended or adjusted under 35 U.S.C. 154(b) by 0 days.

(21) Appl. No.: 10/358,686

(22) Filed: Feb. 5, 2003

(65) Prior Publication Data

US 2004/0148839 A1 Aug. 5, 2004

(51) Int. Cl.[7] .............................................. F41A 21/00
(52) U.S. Cl. ............................... 42/76.1; 89/16; 89/14.7
(58) Field of Search ........................ 42/76.1; 89/16, 89/14.7

(56) References Cited

U.S. PATENT DOCUMENTS

| | | | |
|---|---|---|---|
| 1,391,009 A | 9/1921 | Schneider | |
| 1,540,654 A | 6/1925 | Schneider | |
| 3,577,590 A * | 5/1971 | Dawson et al. | 425/77 |
| 3,727,513 A * | 4/1973 | Wicks | 89/14.1 |
| 3,751,954 A | 8/1973 | Ezra | 72/56 |
| 4,075,926 A * | 2/1978 | Eriksson et al. | 89/16 |
| 4,417,459 A | 11/1983 | Tomita | 72/56 |
| 4,571,969 A | 2/1986 | Tomita | 72/56 |
| 4,911,060 A * | 3/1990 | Greenspan et al. | 89/14.05 |
| 5,083,374 A * | 1/1992 | Miller | 29/895.3 |
| 5,160,802 A * | 11/1992 | Moscrip | 89/16 |
| 5,177,990 A | 1/1993 | Isgen | 72/54 |
| 5,747,693 A * | 5/1998 | Abbate et al. | 73/622 |
| 5,837,921 A | 11/1998 | Rinaldi | 89/14.1 |
| 6,154,946 A * | 12/2000 | Kapp | 29/447 |
| 6,422,010 B1 * | 7/2002 | Julien | 60/527 |
| 6,491,182 B1 * | 12/2002 | Holroyd et al. | 220/581 |
| 6,571,676 B1 * | 6/2003 | Folsom et al. | 89/17 |

* cited by examiner

Primary Examiner—Michael J. Carone
Assistant Examiner—M. Thomson
(74) Attorney, Agent, or Firm—Patterson, Thuente, Skaar & Christensen, P.A.

(57) ABSTRACT

A method of manufacturing a monobloc gun barrel by calculating an optimal residual stress profile and then applying tailored autofrettage mandrels which are mechanically pressed down the bore of a large caliber barrel, the mandrel size optimized to create a residual stress distribution on the interior of the bore within the design constraints imposed by the worst-case heat flux scenario.

18 Claims, 9 Drawing Sheets

METHOD FOR GUN BARREL MANUFACTURE USING TAILORED AUTOFRETTAGE MANDRELS

FIELD OF THE INVENTION

The present invention relates to an improved method of manufacturing a gun barrel. More particularly, the present invention relates to an autofrettage method designed for the manufacturing of liquid cooled barrels subjected to high rates of fire.

BACKGROUND OF THE INVENTION

For years large caliber guns have used residual stress to provide increased strength and fatigue life to the barrel. The method most often used to produce the favorable residual stress is called autofrettage which is a manufacturing process resulting in plastic deformation to the interior of the barrel. The autofrettage increases the elastic strength of the barrel, makes gross change in their resistance to fatigue and inhibits the rate of crack propagation.

The autofrettage plastic deformations can be created in a number of ways including explosive, hydraulic or mechanical means. For example, mechanical autofrettage utilizes a press to force an oversized mandrel through the bore of a pre-machined forging. This causes the material at the bore to yield in tension while allowing the material at the outside diameter to remain elastic. After the mandrel has passed through the bore, the relaxation of the material results in a distribution of residual stress that is compressive on the interior of the barrel. The magnitude of this residual stress is highly dependent on the amount of material yielding that is induced during this process, which is in turn governed by geometric tolerances and material properties.

Recently, the operational firing requirements for large caliber guns have dramatically increased. The emphasis on firing rates in excess of ten rounds per minute for extended periods has complicated barrel construction. High fire rates create a number of problems including "cook-off" of the ammunition propellant, projectile exudation, and increased tube wear. Currently, the gun barrel temperature is monitored during firing, whether in combat or training. When the barrel is judged to be too hot, the firing must be halted to allow the barrel to cool. Therefore, barrels must be cooled by air or liquid to remain operational.

There is a need then to develop barrels with extended life capable of handling the high rates of fire. In general, a balance must be achieved between the thermal stress produced by the cooling system and the residual stress produced by autofrettage. The ability to simply include cooling features in such newly designed larger caliber barrels is not straightforward due to the tremendous pressures created within the barrel, on the order of 60,000 psi. Typically, air cooled large caliber guns have been autofrettaged to a level where plastic deformation occurs throughout approximately 50% of the wall thickness. This practice is acceptable in traditional air cooled barrels where the thermal stresses in the barrel are significantly less than water-cooled barrels. However, air-cooling will not support the higher firing rates.

Therefore, a method is needed for balancing autofrettage stresses with the thermal stresses of a liquid cooled barrel. In the case of actively cooled guns, cooling of the barrels outside diameter induces significant thermal stresses that are incompatible with the stresses induced by traditional autofrettage methods. Previous design approaches therefore have either eschewed autofrettage, and designed to less demanding strength and fatigue requirements, or taken a midwall cooling approach. The creation of cooling channels within the barrel effectively reduces the thermal stresses and allows the level of over strain from the autofrettage process to approach that of a non-cooled design. However, the midwall design involves greater cost and manufacturing complexity.

There is a need then for a method of producing artillery barrels with the strength and fatigue life appropriate for current combat scenarios. The barrel must be able to withstand the pressure and stress associated with the high fire rates. Moreover, it would be desirable, based on cost and manufacturing complexity, to construct such a barrel using existing heat transfer methods so as to avoid the midwall cooling designs. The method should thus incorporate the expected barrel temperature profile and heat flux inputs from a worst case scenario when determining the level of autofrettage. Due to manufacturing tolerances, the method should be tailored for each barrel to further optimize the residual stress distribution to avoid bore collapse yet be as large as possible to maximize the fatigue life.

SUMMARY OF THE INVENTION

The present invention is a method for applying a mechanical autofrettage process to externally liquid cooled artillery barrels. Due to the temperature distribution expected within the barrel due to the rate of fire, the autofrettage process must be limited so as to avoid bore collapse. The level of autofrettage is determined based on the yield strength of the material as compared to the acceptable stress level of the barrel. The method requires creation of a set of autofrettage mandrels, tailored by diameter and taper geometry, which are selectively rammed down the machined barrel so as to create an acceptable residual stress profile. Mandrel selection is based on the yield strength of the forging samples of each individual barrel combined with the individual mapping of the inner diameter of the barrel.

DETAILED DESCRIPTION OF THE INVENTION

A method for gun barrel manufacture using tailored autofrettage mandrels substantially meets the aforementioned needs. The method for barrel manufacture begins with creation of a temperature profile based on barrel geometry and heat flux inputs. An appropriate material is then selected for the barrel forging. Next, the thermal stresses are calculated for the forged barrel based on the temperature profile and a residual stress distribution calculated for the autofrettage process. The resulting stress profile is checked for an acceptable strength margin at design pressures. A tailored mandrel is selected according to the individual barrel characteristics to provide an optimal residual stress profile. The mandrel is then pressed through the barrel.

The process of pressing the mandrel through the barrel is known as autofrettage. Autofrettage involves expansion of the bore of the barrel so as to plastically deform at least the inner layers of the barrel material beyond the elastic limit or yield strength of the material and to thereby generate residual tangential compressive stresses at the cylinder bore. These residual stresses counteract the destructive effects of the internal cyclical or intermittent high operating pressures to which the barrel is subjected to during firing. The plastic deformation of the inner bore of the barrel beyond the elastic limit of the material increases the service life as a function of the strength of the material. Unfortunately, the residual stresses from the autofrettage process tend to induce yielding in the same direction as the service temperature induced stresses. The autofrettage residual stresses must be limited to avoid yielding of the inner bore of the barrel upon the application of the service temperature.

Figure 1:
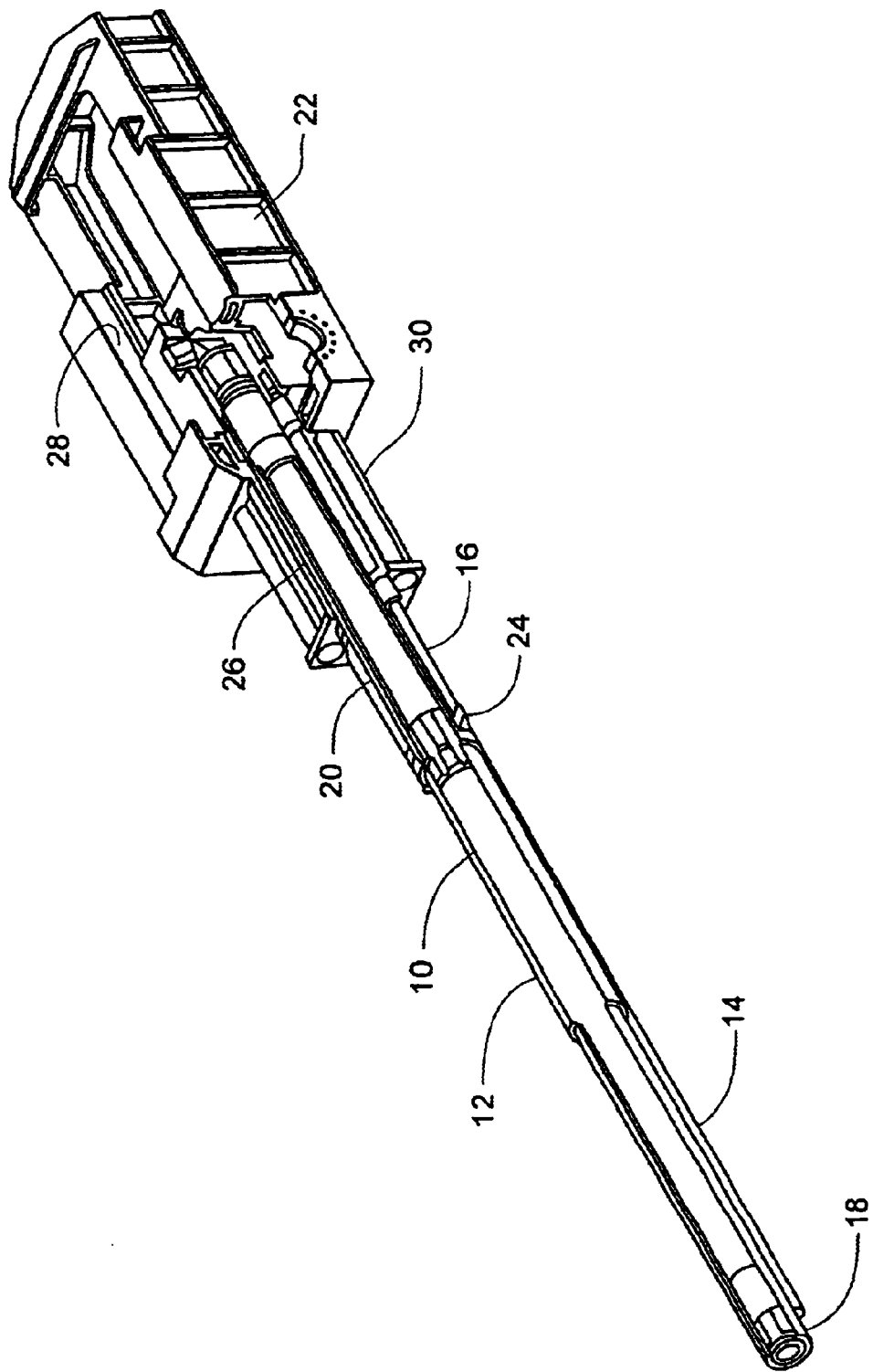
FIG. 1 is a perspective cut-away view of a gun barrel with cooling path illustration.

FIG. 1 illustrates the type of weapon system requiring the tailored autofrettage method of the present invention. FIG. 1 depicts a cutaway of a liquid cooled monobloc gun barrel 10 as mounted within slide structure 22 for the U.S. Navy's Advance Gun System (AGS) as developed by United Defense L. P. The barrel 10 has a caliber of 155 mm and a length of 62 calibers (approximately 378 inches). Barrel service pressure is 53,000 psi.

An external cooling system is required for the weapon based on a sustained firing rate of 12 rounds per minute for 750 rounds. The cooling system provides thermal dissipation for the recoil module 30 and the barrel 10. Coolant enters the system and flows over the four recoil modules 30 and recombines as it flows in to the transfer tube 16 and then into the gun barrel housing 28. The coolant remains in direct contact with the barrel 10 as it travels from the gun barrel housing 28 to the muzzle manifolds 18 at the end of the barrel 10. The barrel 10 is subjected to a wide temperature distribution, thus necessitating two separate coolant control methods. The fluid gap shells 20 control flow velocity over the portion of barrel 10 disposed within barrel sleeve 26. A separate cooling jacket 12 provides flow velocity over the distal portion of barrel 10. The fluid is collected at the muzzle manifold 18 and returned via return line 14 to return manifold 24 and transfer tube 16.

Figure 2:
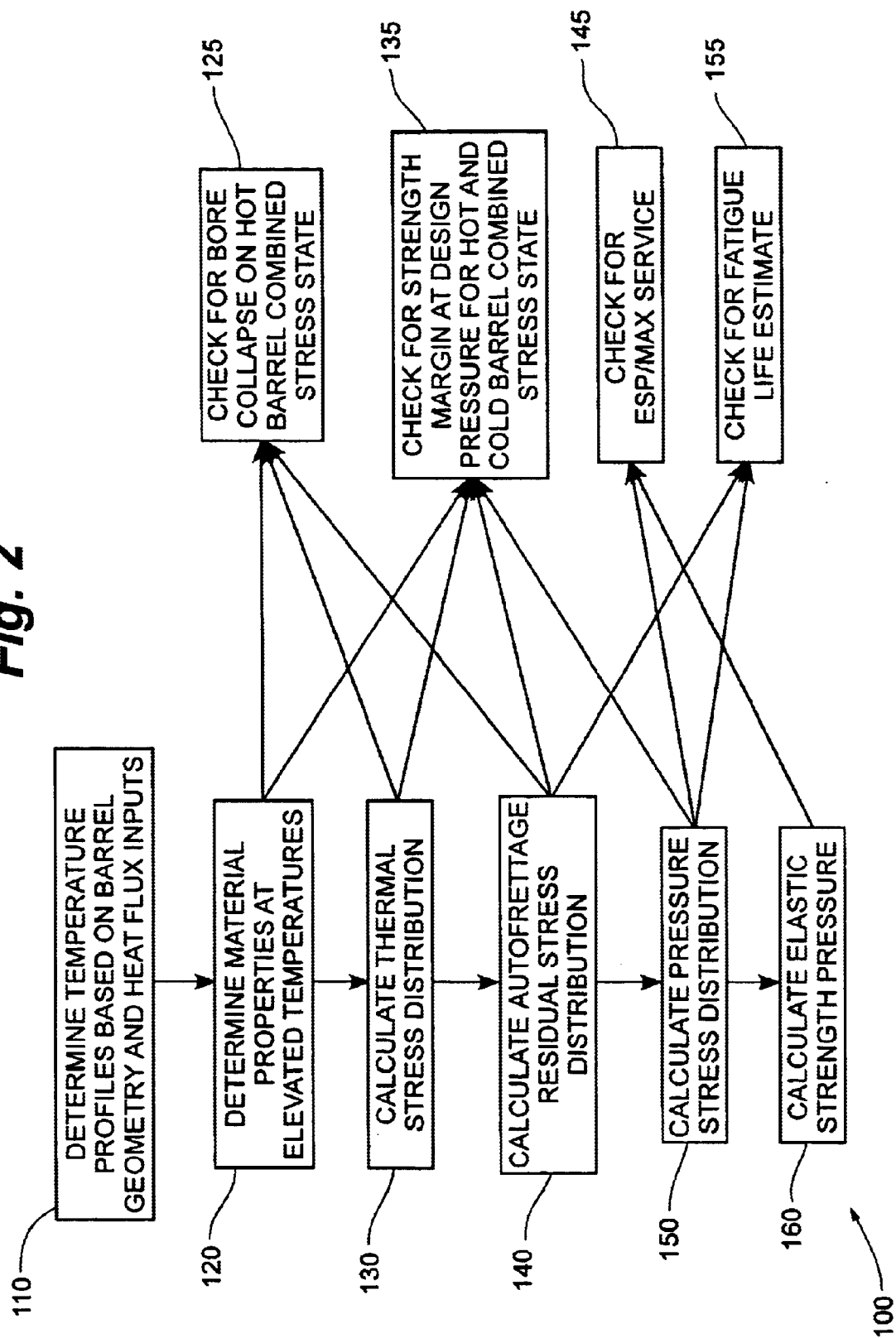
FIG. 2 is a flow chart depicting the logic flow of the present invention.
Figure 3:
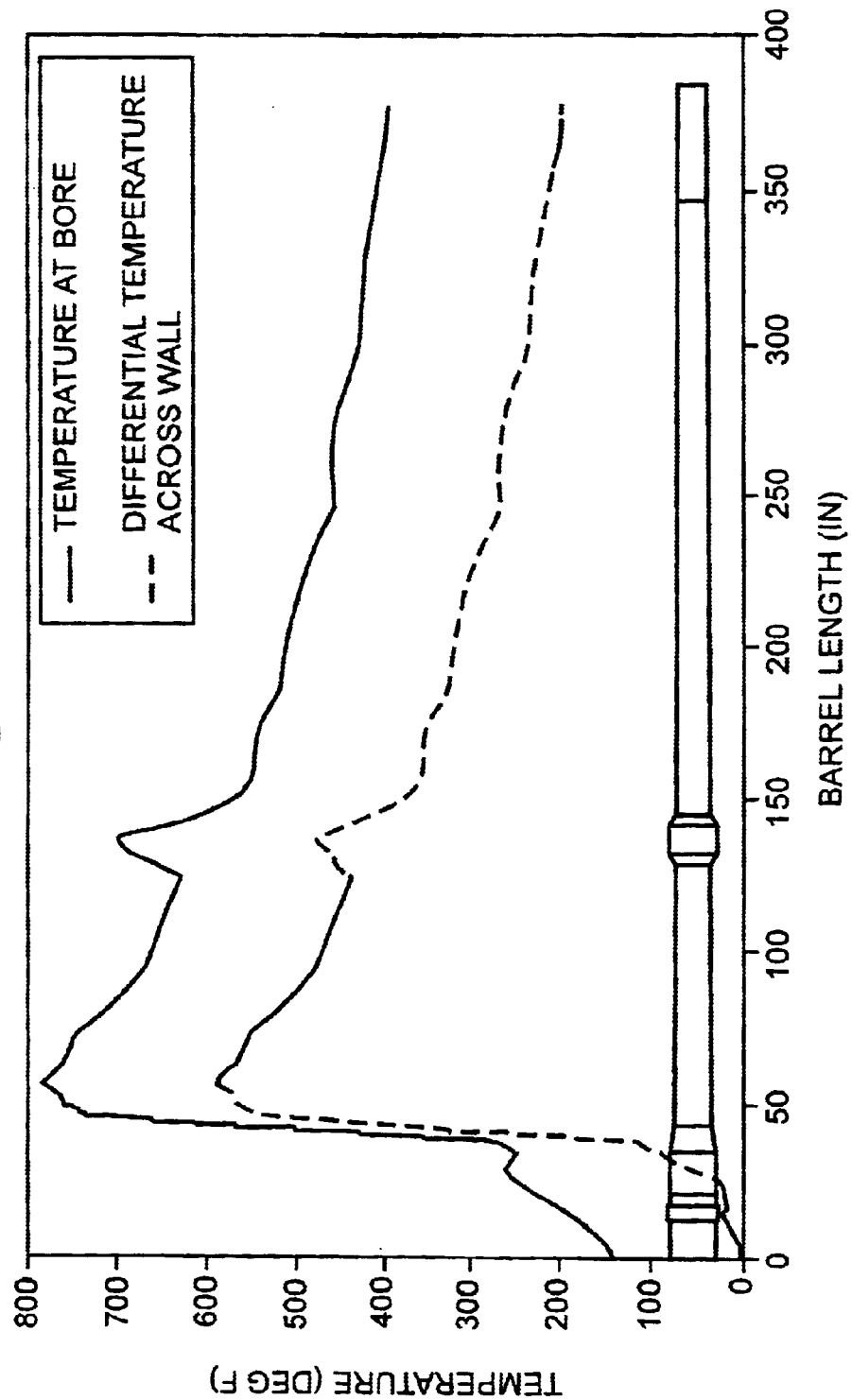
FIG. 3 is a graph depicting bore temperature and the differential wall temperature as a function of barrel length.

FIG. 2 illustrates the manufacturing method 100 of the present invention. The method is initiated by determining a worst case scenario temperature profile 110 based on barrel geometry and heat flux. The thermal stresses created by the high fire rate of modem artillery systems clearly complicate the design process. The autofrettage residual stresses must be limited so that the inner bore of the barrel does not yield under service temperatures. FIG. 3 depicts the relationship between temperature and barrel position relative to the breech face for the AGS system of FIG. 1. The bore temperature at the time of projectile loading for the next firing spikes to 780° Fahrenheit within 50 inches from the breech due to ignition of the propellant and decreases to nearly half that amount at the muzzle. The differential temperature across the barrel wall follows the bore temperature closely within 50 inches of the breech.

Figure 4:
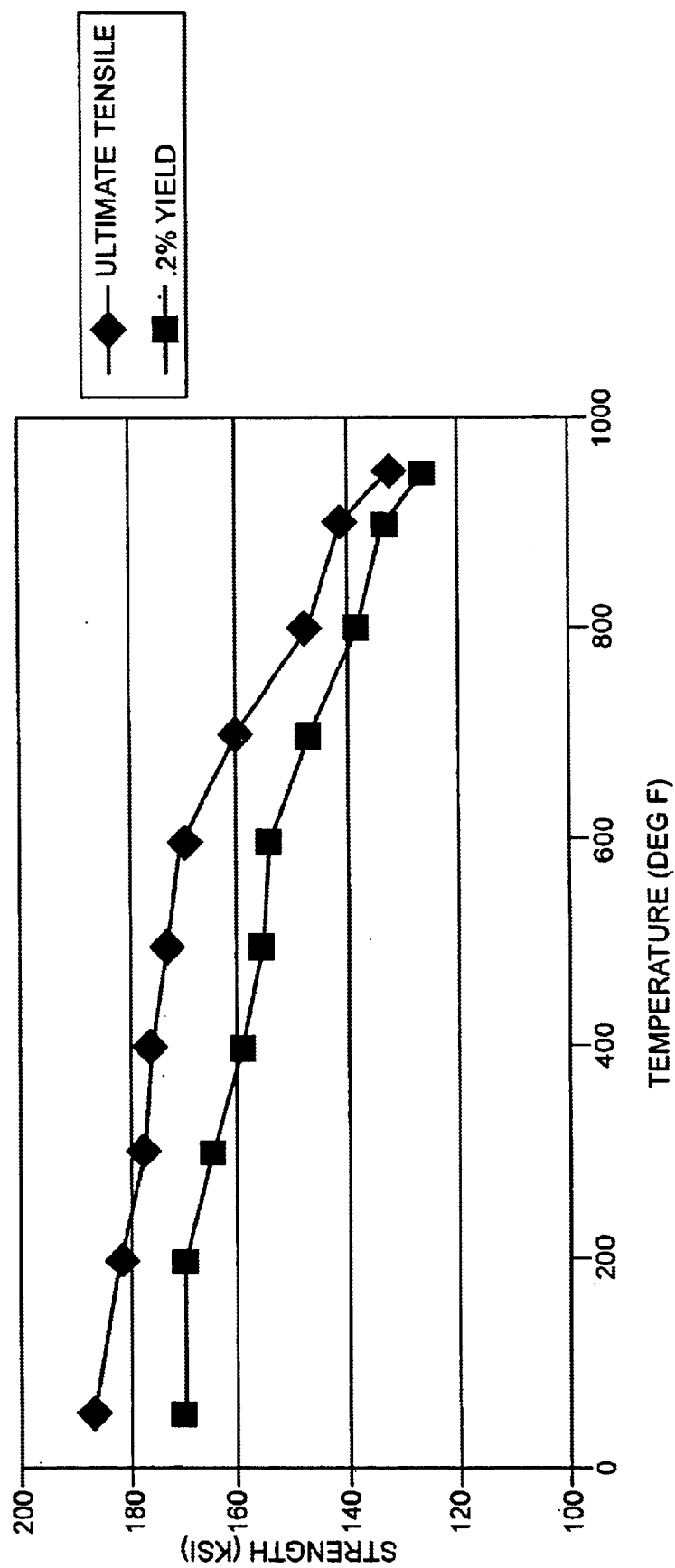
FIG. 4 is a graph depicting ultimate tensile strength of the barrel compared to yield strength as a function of temperature.

The next step 120 requires an evaluation of the material properties of the barrel at the expected temperatures. FIG. 4 depicts the effect the temperature gradient has on the yield strength of the barrel assuming ASTM A723 (Standard Specification for Alloy Steel Forgings for High-Strength Pressure Component Application). As the temperature in the breech approaches 800° Fahrenheit, the yield strength of the barrel drops by 30,000 psi.

Figure 5:
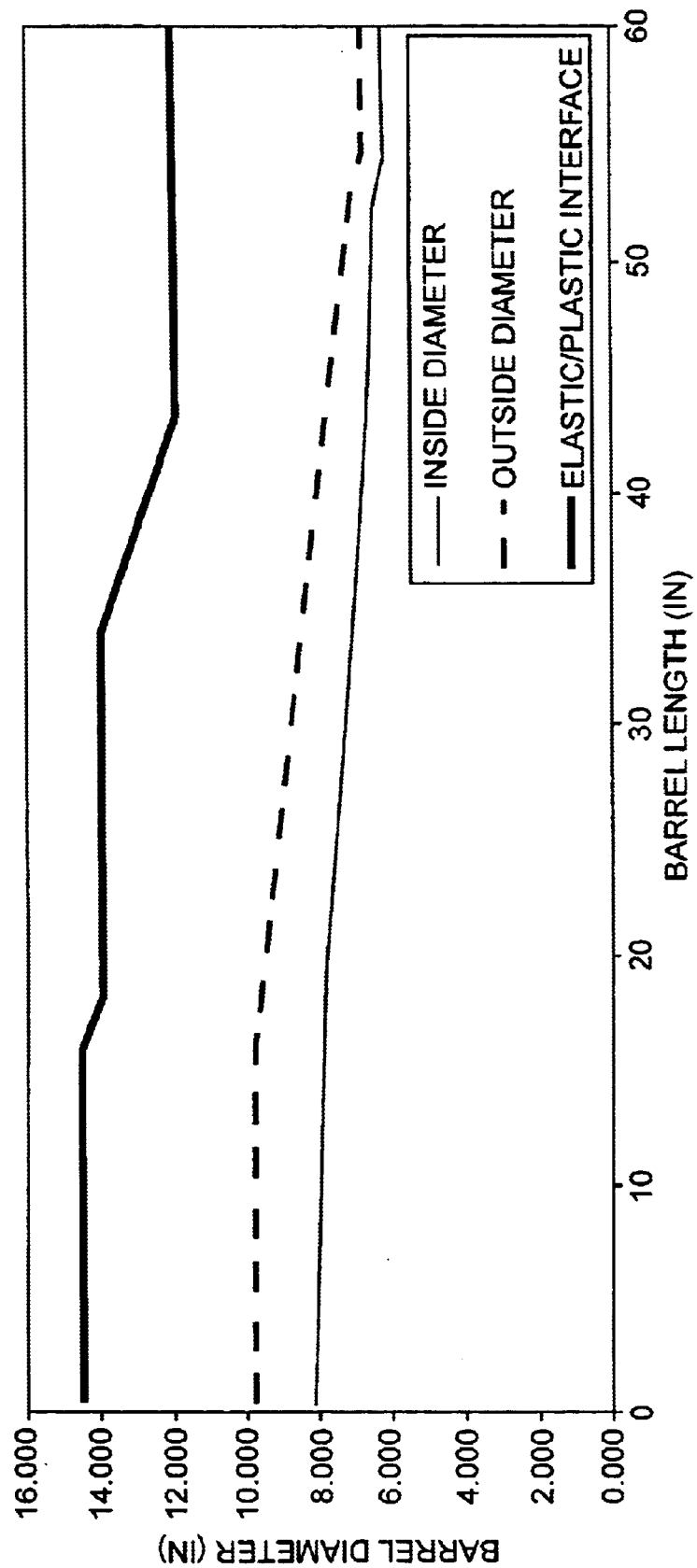
FIG. 5 is a graph depicting the preferred autofrettage profile for a barrel.

Thermal stress distributions 130 are then calculated for the proposed barrel design. With the geometry, material selections and thermal loading determined, the autofrettage residual stress profile 140 can be calculated. FIG. 5 depicts the preferred autofrettage profile for the first sixty inches of the AGS barrel. Here, the elastic/plastic profile combined with the thermal stress require a variable depth autofrettage profile of approximately 25% at the breech to only about 10% overstrain at the beginning of the rifling. The centerline represents the elastic/plastic interface which is the depth of autofrettage.

Figure 6:
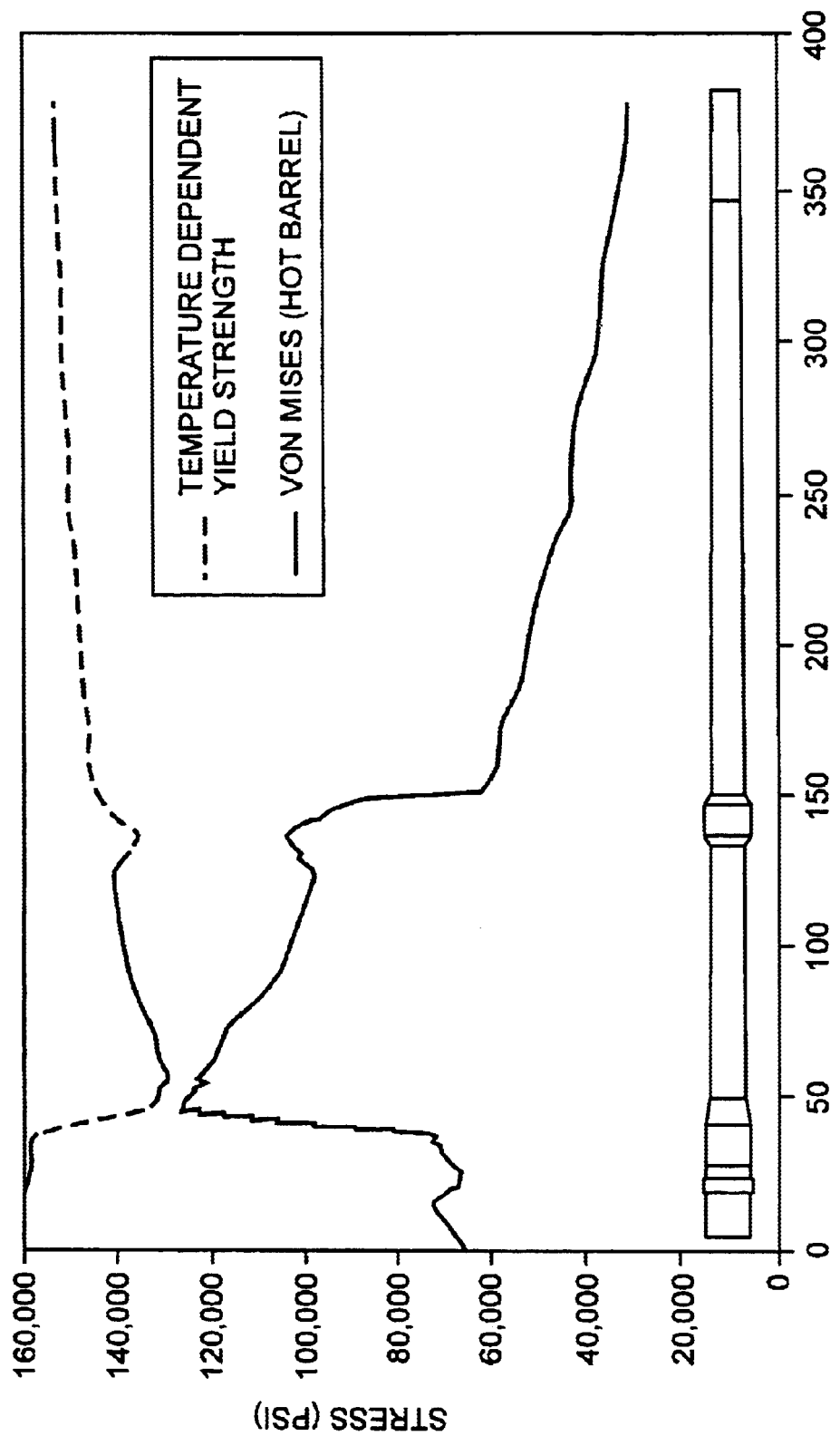
FIG. 6 is a graph depicting the temperature dependency of the yield strength of the barrel compared to the Von Mises stress generated by the thermal stress and the autofrettage residual stress.

Based on the autofrettage profile 140 a pressure stress distribution 150 and elastic strength pressure 160 for the barrel are calculated. The resultant stress distributions are checked for bore collapse 125, strength margin 135, elastic strength pressure 145 and fatigue life 155. For example, FIG. 6 illustrates the yield strength for the barrel based on the temperature profile compared to the Von Mises stress distribution that is generated by the combination the thermal stresses and the autofrettage residual stresses. The forging in this example has an ambient yield strength on 165,000 psi. FIG. 6 illustrates a worst case load from a bore collapse perspective. Moreover, should the fatigue life measurement exceed current expectations, the maximum service pressure for the barrel could be increased.

As thermal stress distributions drive barrel design, there is less margin for error in the autofrettage process. Prior art processes always assumed that the bore diameter and the yield strength were uniform or that the autofrettage expansion was great enough to outweigh any structural difference in the barrel. In those cases only one mandrel was required. However, variations in material properties of the barrel forging and bore diameters can cause significant changes to the actual residual stresses created by the autofrettage process. These problems are magnified when a light autofrettage process is used. For example, in the AGS a variation of 0.0076 mm (0.003 inches) on the bore diameter can result in a 12,000 psi reduction in the Von Mises residual stress. Likewise, a 10,000 psi reduction in the yield strength of the barrel resulted in a residual stress increase of 9,000 psi.

Figure 7:
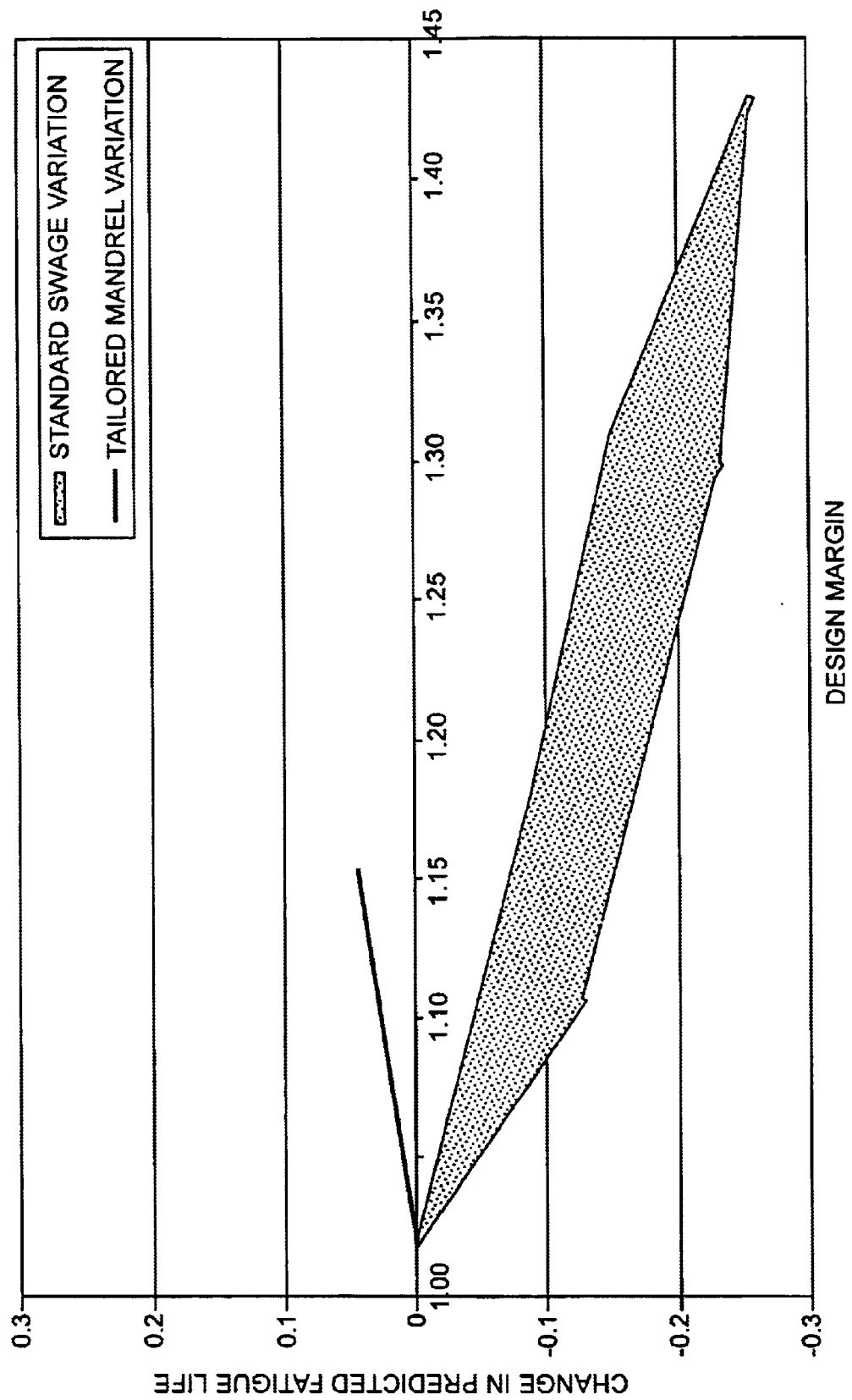
FIG. 7 is a graph depicting the increase in fatigue life of the barrel due to the use of tailored mandrels as compared to a standard mandrel.
Figure 8:
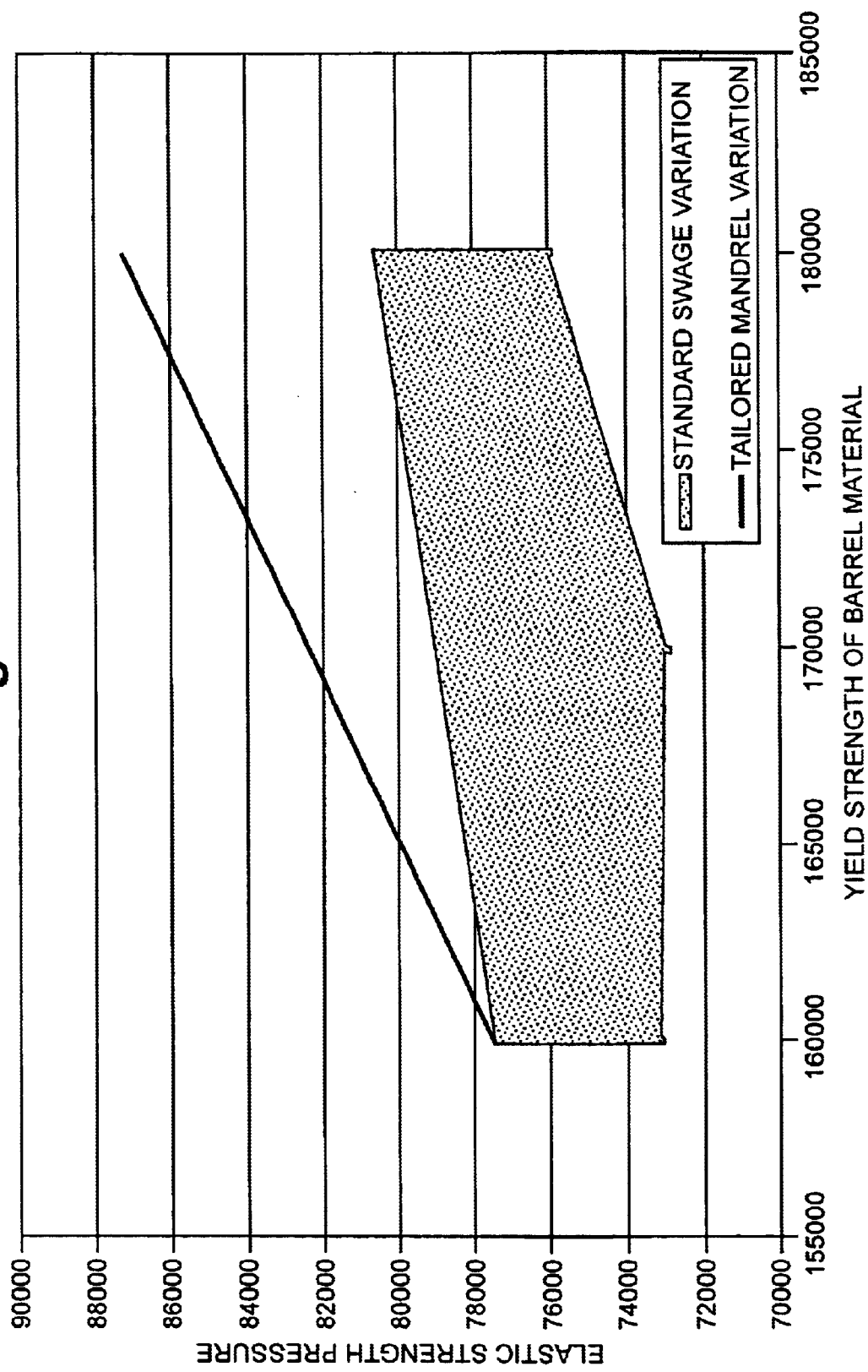
FIG. 8 is a graph depicting variation in elastic strength of the barrel due to the use of a tailored mandrel as compared to a standard mandrel selection.

Therefore, during the manufacturing process for each barrel, information will be gathered to determine precisely which mandrel will produce the desired residual stress distribution within the barrel. This information will include measuring actual yield strength of the material from forging test records as well as the actual measured diameter of the bore from inspection records. In this way the variation of the final barrel properties can be controlled much more closely. FIGS. 7 and 8 illustrate how a tailored mandrel, which is selected based on individual barrel characteristics, dramatically improves barrel performance. The tailored mandrel in FIG. 7 provides increased fatigue life as a function of bore collapse while elastic strength is enhanced by the use of a tailored mandrel (FIG. 8).

Once the autofrettage profile is calculated and checked samples from the forging of each barrel will be tested for yield strength and the geometry of the unfinished inner diameter of each barrel will be mapped. From the combination of these results, an appropriate mandrel will be selected to provide the optimal autofrettage profile to the barrel. The diameter of the mandrel, the number of tapers and the length of the constant diameter sections will be optimized for each barrel. For the AGS barrel, it is envisioned that the mandrel will be constructed out of tungsten carbide. Mandrel diameters will vary by 0.001 inches, and constant diameter sections will range between 0.25 and 0.75 inches long. The press force required to press the mandrel through the barrel ranges from 400 to 700 kip. Upon completion of autofrettage, the outer barrel is machined to its finished diameter and then excess inner barrel material is removed. Proof firing pressure is applied followed by service temperature. Finally, proof pressure and service temperature are applied simultaneously.

Figure 9:
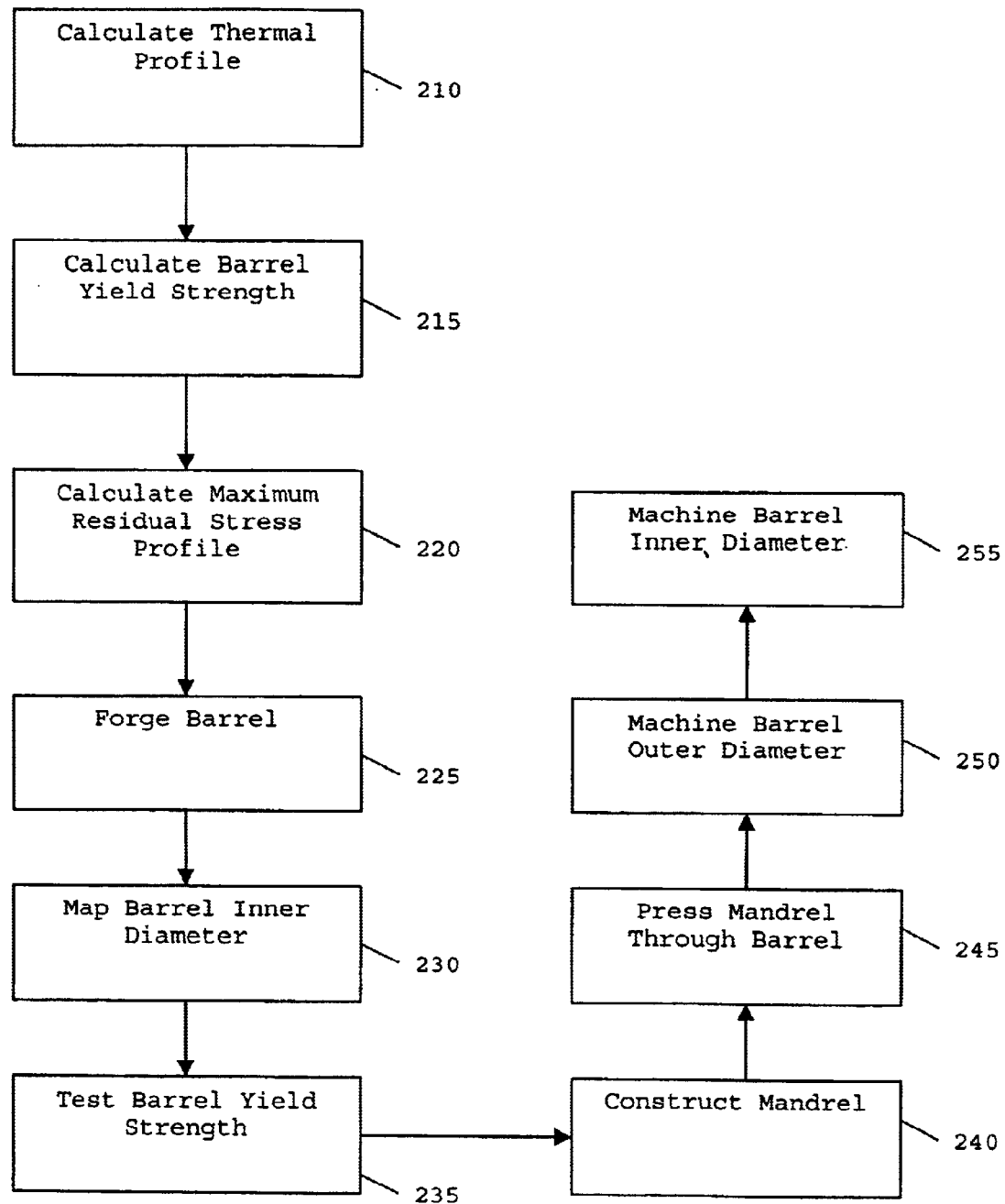
FIG. 9 is a flow chart showing one application of the instant mechanical autofretting process in manufacturing artillery barrels.

One example of the instant process is depicted in flow chart form in FIG. 9, generally at 200. At 210, the thermal profile of an artillery barrel is calculated using a worst-case scenario therefor. The worst case scenario is based on barrel geometry and heat flux characteristics of the material used to manufacture the barrel, more fully discussed above. The barrel yield strength is then calculated at 215 using, e.g., a standard procedure such as ASTM A723 as a predictive model. At 220, the maximum residual stress profile is calculated, wherein the pressure stress distribution and elastic strength pressure of the barrel are calculated. At 225 the barrel is forged from the materials and at the specified dimensions. Information necessary to construct a mandrel for the present autofretting protocol is gathered by mapping the barrel inner diameter at 230 and testing the barrel yield strength at 235. The information obtained from steps 230 and 235 is used to construct the mandrel 240. The mandrel is then pressed to the forged barrel at 245. The barrel is then completed by machining the barrel to a specified outer diameter at 250 and a specified inner diameter at 255.

It is obvious to those skilled in the art that other embodiments of the device and method in addition to the ones described herein are indicated to be within the scope and breadth of the present application. Accordingly, the Applicant tends to be limited only by the claims appended hereto.

What is claimed is:

1. A method of manufacturing a thick walled large caliber gun barrel, wherein the barrel requires active cooling to maintain a rate of fire, comprising the steps of:
    calculating a thermal profile for the barrel based on barrel geometry, barrel material and heat flux produced from a maximum fire rate scenario;
    calculating a barrel yield strength of the barrel based on the thermal profile;
    calculating a maximum residual stress profile based on the barrel yield strength;
    forging the barrel;
    mapping the inner diameter of the barrel;
    testing the yield strength of the barrel forgings;
    constructing a mandrel, wherein said mandrel is sized according to the inner diameter of the barrel, yield strength of the forging and residual stress profile;
    pressing the mandrel through the barrel;
    machining the outer diameter of the barrel to its finished dimensions; and
    machining the inner diameter of the barrel to its finished dimensions.

2. The method of claim 1 wherein the barrel is housed within a multizone cooling chamber containing a circulating liquid.

3. The method of claim 2 wherein the barrel cooling requirements are greatest at a breech end of said barrel.

4. The method of claim 1 wherein the barrel is a monobloc design.

5. The method of claim 1 wherein the mandrels are shaped with constant diameter lengths ranging from 0.25 to 0.75 inches.

6. The method of claim 1 wherein the diameter of the mandrels varies in increments of 0.001 inches.

7. The method of claim 1 wherein said barrel is subjected to service temperatures of up to 783°.

8. The method of claim 1 wherein pressing the mandrel down the barrel results in a favorable residual compressive stress distribution including a plastic deformation of less than the thickness of the barrel.

9. The method of claim 8 wherein 25% of the barrel wall thickness will be plastically deformed at a breech face.

10. The method of claim 8 wherein 10% of the barrel wall thickness will be plastically deformed at an origin of the rifling.

11. The method of claim 1 wherein an internal pressure due to firing the gun is up to 64,500 psi.

12. The method of claim 1 wherein the yield strength of the barrel is in the range of 160,000 to 180,000 psi.

13. A method of subjecting a gun barrel to autofrettage wherein the inner bore of said barrel is subjected to pressure resulting in a plastic deformation of less than the thickness of the barrel wall, said method comprising;
    establishing a thermal profile for the barrel based on barrel geometry and heat input from a worst-case scenario fire rate;
    calculating an autofrettage stress that the barrel can support based on the thermal profile;
    measuring a yield strength of each barrel forging;
    mapping the inner bore diameter;
    constructing a mandrel sized to produce the autofrettage stress based on the yield strength and dimensions of an individual barrel; and
    applying said autofrettage stress by ramming said mandrel in a single pass through the inner bore of the barrel.

14. The method of claim 13 wherein the barrel is constructed of a high-strength alloy steel.

15. The method of claim 14 wherein the barrel is constructed according to ASTM A 723 for alloy steel forging.

16. The method of claim 13 wherein a mandrel yield strength is greater than the yield strength of the barrel.

17. The method of claim 16 wherein the mandrel is constructed of tungsten carbide.

18. The method of claim 13 wherein ramming the mandrel requires a press force with a range of 400 to 700 kip.

* * * * *

UNITED STATES PATENT AND TRADEMARK OFFICE
CERTIFICATE OF CORRECTION

PATENT NO. : 6,810,615 B2
DATED : November 2, 2004
INVENTOR(S) : Michael J. Hermanson, Brian Bauman and Donald A. Nalley It is certified that error appears in the above-identified patent and that said Letters Patent is hereby corrected as shown below:

Column 1,
Line 58, please delete "air cooled" and insert -- air-cooled --

Column 4,
Line 48, please delete "0.0076" and insert -- .0076 --

Signed and Sealed this

Thirty-first Day of May, 2005

JON W. DUDAS
*Director of the United States Patent and Trademark Office*